United States Patent [19]
Lupke

[11] Patent Number: 5,123,827
[45] Date of Patent: Jun. 23, 1992

[54] EXTRUSION DIE HAVING ELONGATED EXTRUSION NOZZLE WITH FACILITATES TOOL CHANGES

[76] Inventor: Manfred A. A. Lupke, 10 McLeary Ct., Concord, Ontario, Canada, L4K 2Z3

[21] Appl. No.: 580,879

[22] Filed: Sep. 11, 1990

[30] Foreign Application Priority Data

Sep. 28, 1989 [CA] Canada ................................. 613930

[51] Int. Cl.⁵ .............................................. B29C 47/26
[52] U.S. Cl. ............................... 425/133.100; 264/241; 425/188
[58] Field of Search ........... 425/190, 130, 191, 192 R, 425/188, 326.1, 461, 466, 376.1, 378.1, 133.1, 224, 387.1, 388, 392, 393; 264/241

[56] References Cited

U.S. PATENT DOCUMENTS

| | | | |
|---|---|---|---|
| 3,357,051 | 12/1967 | Zolotarevsky | 425/192 R |
| 3,471,899 | 10/1969 | Ronden | 425/192 R |
| 3,677,676 | 7/1972 | Hegler | 425/192 R |
| 3,856,446 | 12/1974 | Schultz | 425/192 R |
| 4,712,993 | 12/1987 | Lupke | 425/326.1 |
| 4,770,618 | 9/1988 | Lupke | 425/326.1 |
| 4,798,526 | 1/1989 | Briggs et al. | 425/192 R |

Primary Examiner—Jay H. Woo
Assistant Examiner—W. J. Matney, Jr.
Attorney, Agent, or Firm—Jane Parsons

[57] ABSTRACT

The invention concerns extrusion dies for apparatus for producing seamless thermoplastic tubing. An elongate hollow core is provided extending through a bore in the extrusion head. The hollow core may carry service lines to downstream parts of the apparatus and may act as or may carry an inner mandrel extending coaxially in an extrusion nozzle. The invention provides hollow core, the diameter of which is not greater than the diameter of the bore of the extrusion head. Thus, it may be possible to withdraw the core in a downsteam direction for tool changes and the like without the necessity of dismantling the extrusion head.

21 Claims, 4 Drawing Sheets

EXTRUSION DIE HAVING ELONGATED EXTRUSION NOZZLE WITH FACILITATES TOOL CHANGES

FIELD OF THE INVENTION

The invention relates to apparatus comprising means for extruding a parison having an annular cross-section and a mold tunnel for the parison. Such apparatus may comprise, for example, an extrusion nozzle for thermoplastic material and a mold tunnel of the travelling type, for example, for continuously molding thermoplastic tube. The apparatus may be suitable for the production of various types of tube, e.g. single walled, double walled, corrugated ribbed and combinations thereof, etc.

BACKGROUND OF THE INVENTION

Such apparatus conventionally comprises a hollow core extending longitudinally through the extrusion nozzle, into the mold tunnel and extending rearwardly through the extrusion head. Such a hollow core may act as an inner mandrel about which extrudate flows in an annular channel defined between the core and the outer casing of an extrusion nozzle. Extrudate may be introduced into the channel by a lateral opening thereinto and/or by an axial opening thereinto or when more than one channel is provided for plastic flow, by either or both lateral or axial openings.

The core performs various important functions. Within its hollow interior, it may carry pipes carrying blowing air to press the parison against the mold tunnel, pipes carrying cooling fluid to cool and help set thermoplastic parison located against the mold tunnel, pipes carrying heating fluid, if desired, pipes carrying suction for application to the inner surface of the parison, if desired, pipes carrying lubricant, hydraulic fluid, etc. The outside of the core may carry a forming plug located within the mold tunnel for forming the interior surface of the parison and maintaining its shape until the thermoplastic material is sufficiently set to retain it shape without assistance. Such a plug may be a cooling plug to aid setting of the thermoplastic material. It may be lubricated at its surface, may have applied suction at its surface, may provide other services at its surface from service pipes within the core. A heating plug and follower plugs may, in some circumstances also be carried by the core.

When the tube is to be corrugated pipe various aids for pressing the pipe into the corrugators of the mold tunnel may be carried by the core.

The core may carry at least one spider to carry services from the core to the interior of an outer parison and/or as a spacer for annular channels of the extrusion nozzle.

Still further the core may carry an inner die lip defining, with an outer lip an extrusion orifice opening for an angled exit passage the geometry of which is of considerable importance in different applications. Alternatively, the upstream end of the cooling plug may be shaped to form the appropriate angle for the exit passage.

At the downstream end of the core means may be provided to allow for slight longitudinal movement to adjust, for example, the width of the exit passage and means may also be provided to inhibit twisting of the core, there causing torsion of the parison.

The outer casing of the extrusion nozzle may be coaxial with the core and assembled with the extrusion head downstream thereof. The outer casing of the extrusion nozzle carries shaping die lips which often flare outwardly from the general diameter of the extrusion nozzle.

When double walled tubing is to be produced a hollow mandrel is present intermediate between the outer casing of the extrusion nozzle and the inner core and coaxial with them. This mandrel also carries die lips at its extrusion orifice.

All these coaxial integers may require replacement from time to time for pipe size changes or for other functions.

Of these functions, replacements in the form of tool changes for change of pipe size are perhaps the most common. For different sizes of tube it is frequently necessary to replace the die lips, the forming plug and, indeed the core itself. When double walled tube is involved change of the intermediate mandrel may be necessary. It is sometimes necessary to add a new part to carry out an additional function.

For such tool changes, it is, with conventional equipment necessary to disassemble the core and extrusion nozzle from the extrusion head and mold tunnel.

Since the core may carry parts on its outer surface, which parts may be of greater diameter than the core itself, and because the outer casing of the extrusion nozzle is attached to the extrusion head downstream thereof, has not been easy to withdraw the core and extrusion nozzle from the apparatus.

Indeed to access some components it has been necessary to disassemble the whole of the extrusion head involving a large amount of time and energy.

SUMMARY OF THE INVENTION

The inventor has attempted to devise an arrangement to allow for improved facility in accessing the components downstream of the extrusion head in this respect a novel approach has been taken in that the possibility of withdrawing the core with the extrusion nozzle from the apparatus in a downstream direction was investigated. This has not previously been possible due to the structure of cores which conventionally have a stop flange upstream of the extrusion head for locating the core in proper position. Such cores are illustrated in, for example U.S. Pat. No. 4,712,993 and U.S. Pat. No. 4,770,618 both issued to Lupke on Dec. 15, 1987 and Sep. 13, 1988 respectively. Other cases have been provided with keying arrangements to allow limited axial motion of the core without rotation. Such keying arrangements are also illustrated in the above noted patents and would, even without the stop flange, prevent full withdrawal of the core in the downstream direction.

When an intermediate mandrel is present to define two annular channels within the extrusion nozzle for the production of double walled tubing, it may, together with a coaxial channel in the extrusion head, be tapered to reduce in diameter in the downstream direction thus precluding any possibility of withdrawal of this component in a downstream direction. Such an arrangement is illustrated in both the previously referred to U.S. patents.

In accordance with the invention there is provided an extrusion die for apparatus for producing seamless thermoplastic tubing including; an extrusion head having a bore therethrough and at least one input port to the bore for thermoplastic extrudate; an elongate extrusion nozzle releasably attached to the extrusion head to extend the bore longitudinally in a downstream direction for extrudate; an elongate hollow core of diameter not exceeding that of the bore, extending coaxially through the bore, the core having an upstream portion upstream of the input port and extending out of the bore in the upstream direction, and a downstream portion forming a mandrel coaxial within the extrusion nozzle and projecting therefrom; the upstream core portion being attached to the extrusion head through an upstream threaded core end releasably engaged with a correspondingly threaded collar which is also attachable to the extrusion head.

The connection between the elongate extrusion nozzle and the extrusion head may be by screw threading between a nozzle collar of the extrusion head and a upstream end of the extrusion nozzle.

The core and the extrusion nozzle may define a single annular channel between them for the production of single walled tube or a hollow mandrel may be provided coaxially intermediate the core and the elongate extrusion nozzle, thereby providing a further coaxial annular extrusion passage for the production of double walled tubing. The mandrel may separate plastic material flow from each of two extruders or it may separate the flow from a single extruder. The hollow mandrel may be releasably attached to the extrusion head by means of threading between a mandrel collar of the extrusion head and an upstream end of the hollow mandrel for flow from two extruders. For dividing the flow from a single extruder, a downstream end of the mandrel may be supported by a spider.

At the upstream end, the core may be attached to the extrusion head through screw threaded attachment with a core collar bolted to the extrusion head.

Any upstream attachment to the core such as a closing plug, possibly carrying upstream equipment may be attached to the core through an axial female socket of the upstream core end. The downstream portion of the core may carry a forming plug in a mold tunnel. The core may carry inner annular die lips to direct extrudate outwardly from the core and the mandrel respectively towards a molding surface of a mold tunnel. Correspondingly, the downstream end of the extrusion nozzle carries a disengageable outer annular die lip to cooperate with the inner die lip of the core to direct extrudate outwardly therebetween. The inner die lip of the core may be formed by the suitably formed upstream front surface of the forming plug so that the extrudate extrudes directly onto the plug. Suitably the plug may be a cooling plug.

When an intermediate mandrel is present it may carry at its downstream end an outer die lip cooperating with an inner die lip of the core, e.g. the cooling plug and further upstream may carry an inner die lip cooperating with an outer die lip of the extrusion nozzle.

The extrusion head may comprise a two part head, the one part including an first input channel usually to accept thermoplastic material from a first extruder and the other part including a second input channel usually to accept thermoplastic material from a second extruder. These extrusion head parts are usually arranged such that the first and second input channels are directed in diametrically opposite directions or at least angled to one another to allow for suitable location of the extruders.

At least when the core, any intermediate mandrel and other fittings of the extrusion head are symmetrically located, it may be possible to provide the said extrusion head parts attachable together in a first position to connect first and second extruders, or, alternatively in a second position so that they both access the same outlet of one extruder.

BRIEF DESCRIPTION OF THE INVENTION

Embodiments of the invention will now be described by way of example with reference to the drawings, in which.

DESCRIPTION OF PREFERRED EMBODIMENTS

Figure 1:
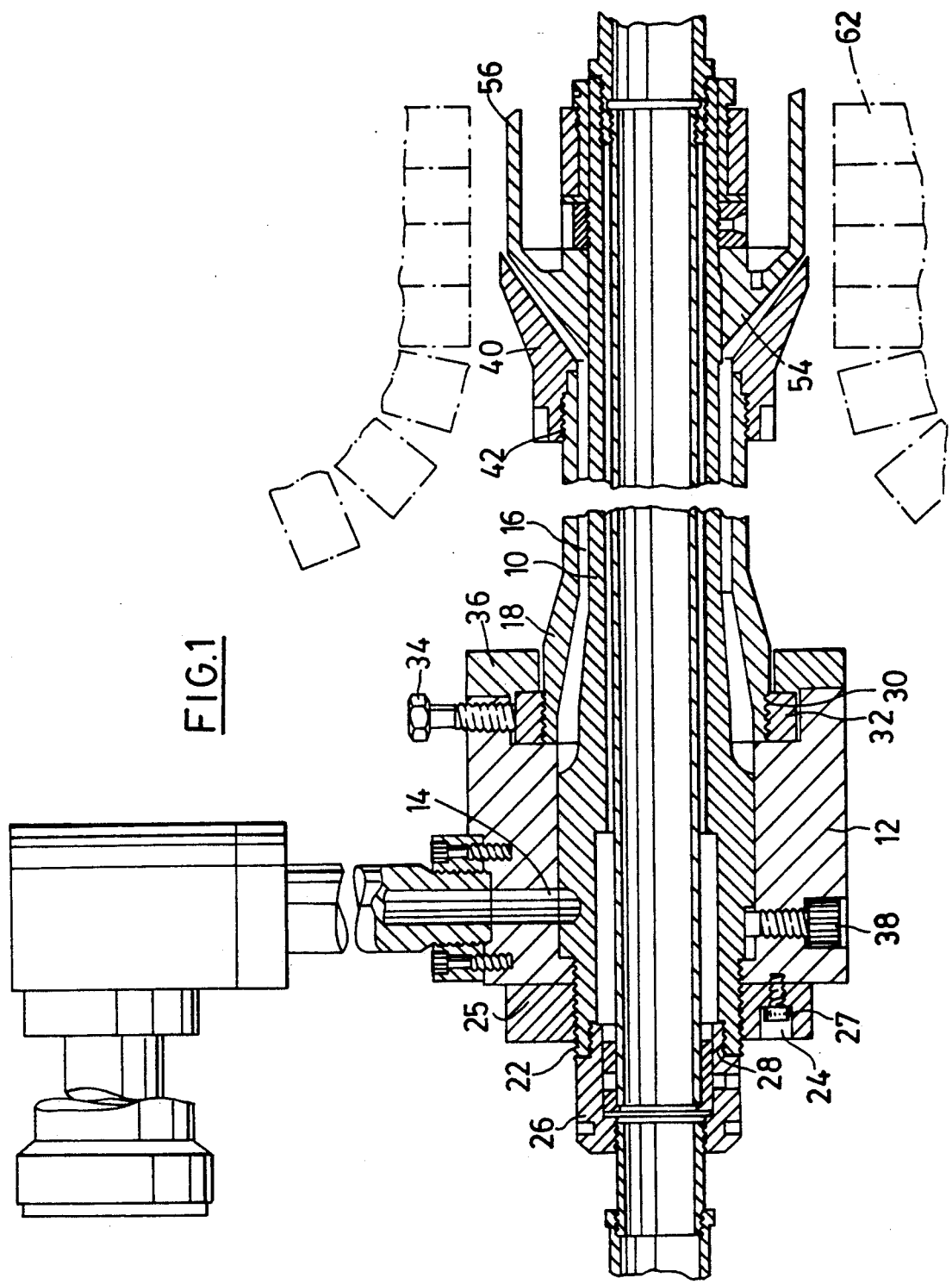
FIG. 1 is a diagrammatic section of one extrusion die embodying the invention for extruding single walled tube.
Figure 2:
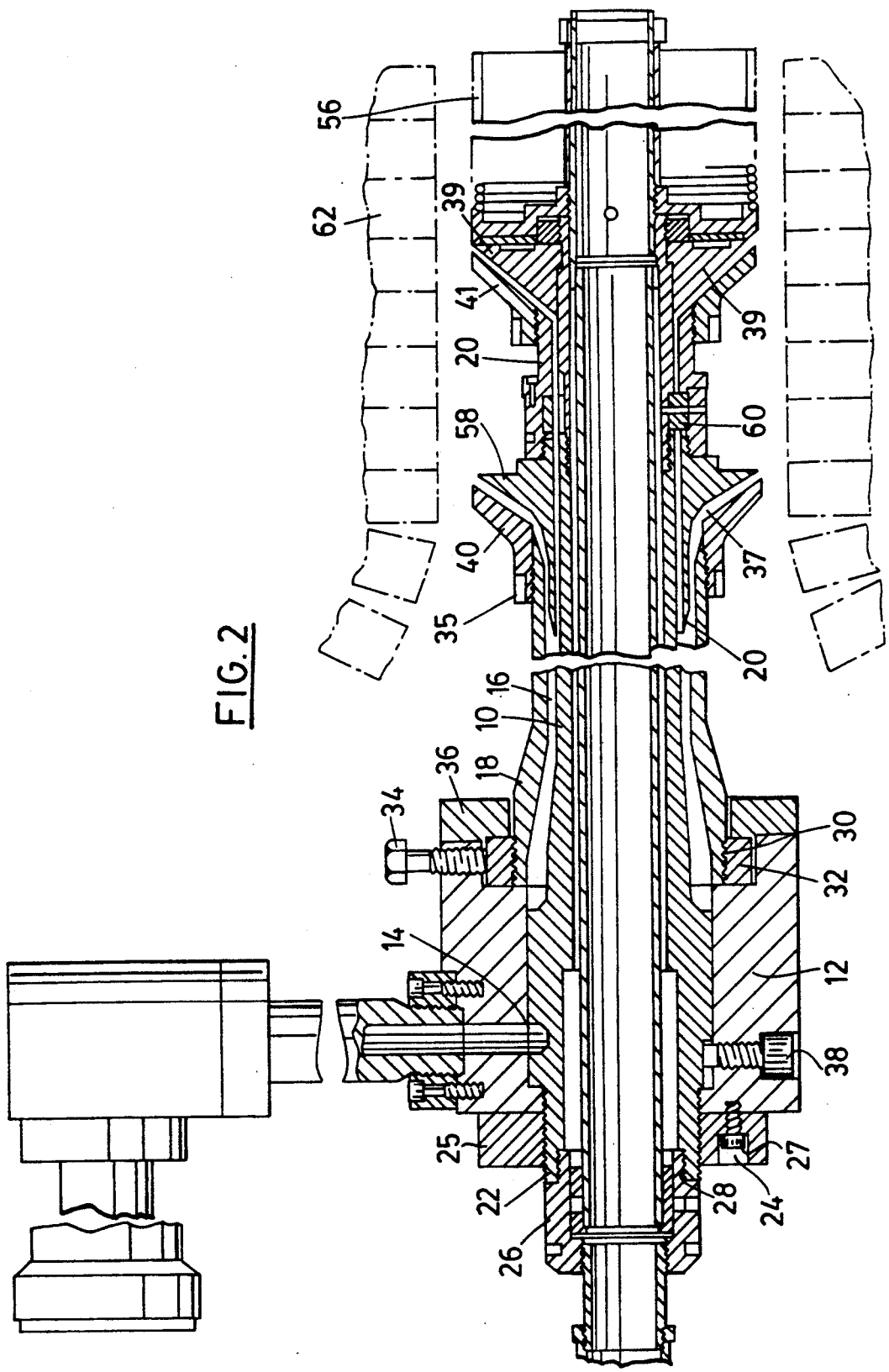
FIG. 2 is a diagrammatic section of another extrusion die embodying the invention for extruding double walled tube.
Figure 3:
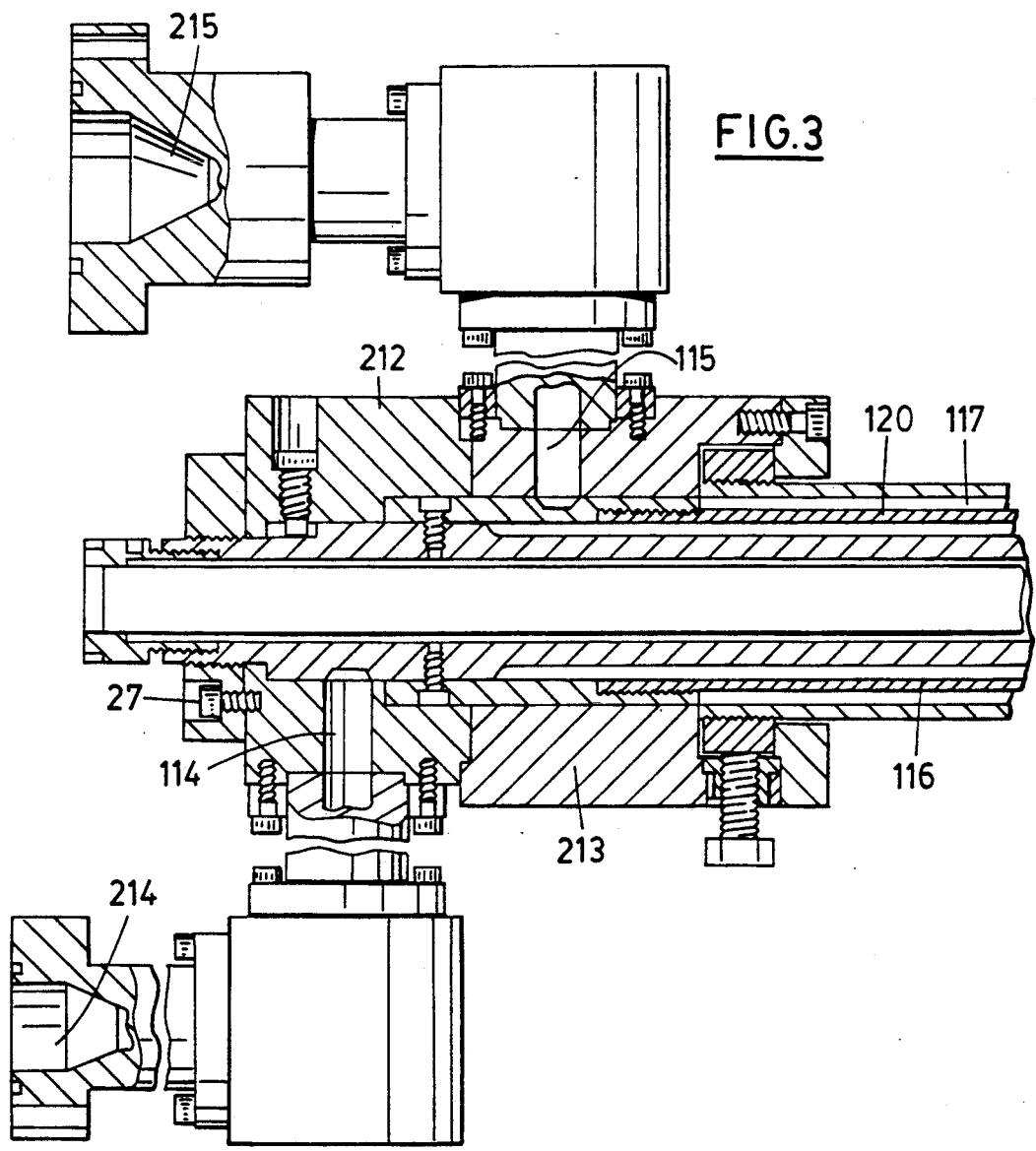
FIG. 3 is a diagrammatic section of another extrusion die embodying the invention for extruding double walled tube.

FIGS. 1, 2 and 3 show extrusion dies for extrusion of single walled tube, double walled tube by splitting of the extrusion flow and double walled tube from two input ports respectively. In these figures like reference numerals are used for like parts where possible and differences between the apparatus are referred to where appropriate.

Figure 4:
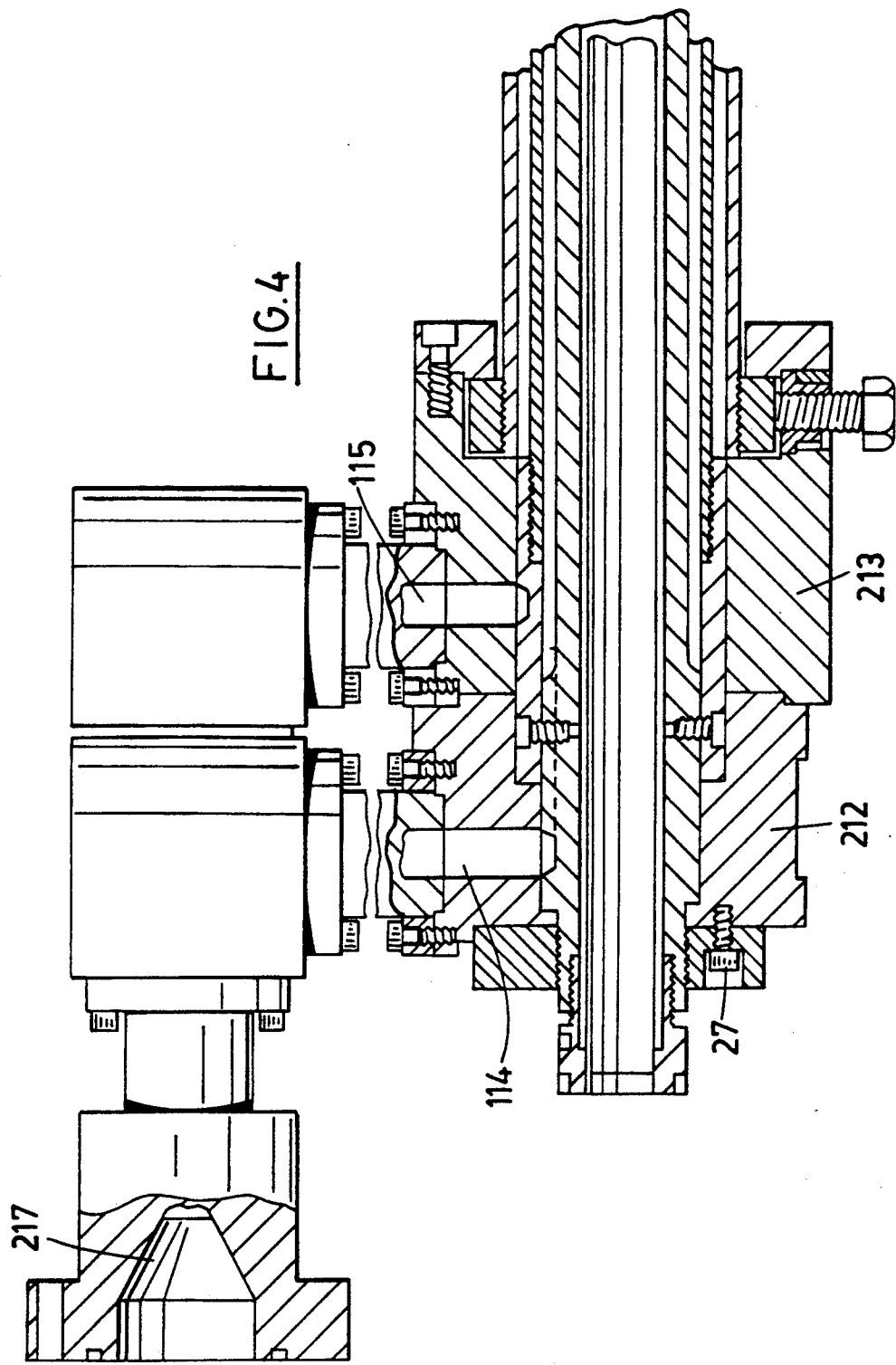
FIG. 4 shows parts of the extrusion head of FIG. 3 relocated to access a single extruder.

In each case, the apparatus comprises an extrusion die having an inner core which acts as an inner mandrel the inner core 10 is attached to an extrusion head 12 and extends in a bore within the extrusion head 12. The apparatus of FIGS. 1 and 2 have a single inlet 14 for extrudate of thermoplastic material for forming seamless tube. The extrudate from inlet 14 passes into an annular passage 16 between the inner core 10 and extrusion nozzle 18 surrounding the inner core 10. The apparatus of FIGS. 3 and 4 have two inlets for extrudate 114 and 115. In FIGS. 3 and 4, a hollow mandrel 120 is located coaxially about the inner core 10 within the extrusion nozzle 18 so as to form two annular extrusion channels 116 and 117. The upstream end of hollow mandrel 120 is located and shaped so that extrudate from inlet port 114 flow in annular channel 116 and extrudate from inlet port 115 flow in annular channel 117. In FIG. 2, a coaxial hollow mandrel 20 surrounds hollow core 10 to divide the flow of extrudate in channel 16 into an inner continuing channel 25 and exiting outer exit channel 35.

The general arrangements so far described are known arrangements for the production of various types of tube. In known arrangements, the upstream end of the inner core, the intermediate hollow mandrel, and the extrusion nozzle 18 may be provided with integral or fixed radially outwardly extending collars which may be bolted onto the extrusion heads. Such collars prevent the withdrawal of the inner core 10, the intermediate mandrel or the extrusion nozzle through the extrusion head. In the case of extrusion nozzle, this may not be particularly important, but for accessing tools on the inner core or on the intermediate mandrel, it may be necessary to dismantle the extrusion head to change tools thereon. FIGS. 1, 2 and 3 of the drawings show a new arrangement for the connection of the inner core 10, the intermediate mandrel 120, and the extrusion nozzle 18. In all cases, the diameter of the core 10 is no greater than the diameter of the bore of the extrusion head 12.

At the upstream end of core 10, the core is provided with screw threading 22 on an upstream portion which extends out of the bore of extrusion head 12 in the upstream direction. A collar 24 has an inner surface with corresponding screw threading by which it is releasably engageable with the core. The collar 24 also has a radially extending flange 25 by which it may bolted to the extrusion head 12. Thus, by releasing the bolts 27 of the collar to release it from the extrusion head and by unscrewing the core from the collar 24, the core may be withdrawn in a downstream direction from the extrusion head without necessity to disassemble the extrusion head.

The core may be closed at the upstream end by a plug 26 which may carry connections for services to extend within the core, such as vacuum lines for air, gas carrying lines or fluid carrying lines for blowing air or for heating or cooling purposes, hydraulic lines, etc. The plug may carry other upstream tools if desired. Conveniently, the plug is connected with the core through internal screw threading 28 on an female axial end socket of the core. This socket corresponds with a fitting, similarly screw threaded male member of the plug.

Downstream of the extrusion head, the extrusion nozzle 18 may be connected to the downstream side of the extrusion head in a somewhat similar manner. An outer surface of an upstream end of the extrusion nozzle 18 is provided with screw threading 30 to releasably engage a nozzle collar 32 which fits loosely in a recess in the extrusion head in which it may be centered by centering screws 34. A radially extending second collar 36 which overlaps the nozzle collar 32 may be bolted to the extrusion head 12 to hold the assembly in place. As a result of this arrangement, the extrusion nozzle may be released simply from the extrusion head by unbolting collar 36 and unscrewing extrusion head from nozzle collar 32.

Some centering of the core may be achieved through centering screw 38 but this is somewhat limited due to the bolts necessary between collar 24 and the extrusion head 12.

In FIG. 1, where there is only one annular extrusion passage 16, the downstream end of the extrusion nozzle may be provided with an annular die lip 40. The die lip may be attached to the extrusion nozzle by simple screw threading 42, as shown, by which it is easily releasable and, when the core 10 is withdrawn, replaceable by a different die lip. Other means of attachment of the die lip are possible for its axial adjustment on extrusion nozzle 10 or for its replacement.

Generally it is considered desirable that when axially adjustments of the core or the extrusion nozzle are required that these should not involve twisting of either the extrusion nozzle or the core or, when more than one extrusion channel is present, the intermediate hollow mandrel. Keying arrangements are quite common whereby the core, for example, is prevented from rotational movement by providing a key to slide in an annular channel of, say, the extrusion head. Axially adjustment is provided by screw threading between a collar and the core. While it might be possible to allow downstream withdrawal of the core by providing no downstream stop in such keying arrangements, this might lead to upstream leakage of thermoplastic extrudate. Thus, keying arrangements are not desirable in the present invention which is believed to have sufficient advantages to mitigate any disadvantages resulting from the lack of non-rotatable adjustment of the core. It is, however, to be noted that axial adjustment of the core is possible through screw threading 28.

The outer die lip 40 and other die lips to be described hereinafter or the extrusion nozzle may be provided with a further member to bear on the die lips or lip to slide it into a different position.

Downstream of die lips 40 is an inner die lip 54. As shown in FIG. 1, the inner die lip is formed by the frustoconical upstream end of a cooling plug 56. The cooling plug 56 acts to form the inside surface of the tube in an advancing mold tunnel of conventional design.

FIG. 2 shows an intermediate mandrel 20 dividing the extrudate passage 16 into two. The extrusion nozzle ends at die lips 40 which may be similar to those previously described and the upstream end of the mandrel 20 is shaped to form, or is provided with, inner die lips 58. The mandrel 20 itself is supported on a spider mechanism 60 which may serve to carry service lines, for example a line carrying blowing air, from the interior of inner core 10 to produce pressurized atmosphere for forcing extrudate from exit passage 37 against the walls of an advancing mold tunnel 62. The spider 60 may, of course, carry other services and is generally used to support the mandrel. The intermediate mandrel 20 may be a one piece mandrel or might possibly be a two piece mandrel joined at spider 60 whereby independent adjustment of the upstream portion and the downstream portions of the mandrel 20 are possible. The downstream portion of mandrel 20 may carry die lips 39 similar to those described in connection with die lips 40. This die lip at the end of mandrel 20 cooperates with inner die lips 41 on the inner core 10. As before, these inner die lips 41 may be a frustoconical nose portion of cooling plug 56.

The FIG. 3 shows a very similar situation to that of FIG. 2 except that intermediate mandrel 120 extends into extrusion head 12 to separate two input ports 115, 114 and direct them into annular channel 116 and 117 respectively. The downstream end of mandrel 120 is similar to that described for mandrel 20.

FIG. 3 shows the case where input channels 114, 115 connect two separate extruders 214, 215 respectively via the extrusion head 12 to the extrusion nozzle 18.

FIG. 4 shows a detail of such apparatus in which the input channels 114, 115 are arranged differently. Extrusion head 12 may be provided in two axially connecting parts 212, 213 which may be attached one to the other in different configurations. FIG. 3 shows one configuration for different extruders 215, 214. FIG. 4 shows a diametrically opposite configuration for connection to the single passage of a single extruder 217.

A great many variations in general apparatus may be encompassed within the scope of the invention which is directed to the provision of internal extrusion die members including the inner core and any intermediate mandrel surrounding the inner core being of lesser diameter at all points than the internal bore of the extrusion head, whereby these internal components may be withdrawn from the extrusion head without disassembly of the extrusion head for tool changing, maintenance, repair and other replacements which become necessary from time to time.

I claim:

1. An extrusion die for apparatus for producing seamless thermoplastic tubing including:
   an extrusion head having a bore therethrough and at least one input port to the bore for thermoplastic extrudate;
   an elongate extrusion nozzle releasably attached to the extrusion head to extend the bore longitudinally in a downstream direction for extrudate;
   an elongate hollow core of diameter not exceeding that of the bore, extending coaxially through the bore to form a first annular extrusion passage extending coaxially within the extrusion nozzle, the core having an upstream portion upstream of the input port and extending out of the bore in the upstream direction, and a downstream portion forming a mandrel coaxial within the extrusion nozzle and projecting therefrom;
   the upstream core portion being attached to the extrusion head through an upstream threaded core end releasably engaged with a correspondingly threaded collar which is also attachable to the extrusion head.

2. An extrusion die as claimed in claim 1, in which the elongate extrusion nozzle is releasably attached to the extrusion head by means of screw threading between a nozzle collar of the extrusion head and an upstream end of the extrusion nozzle.

3. An extrusion die is claimed in claim 1, in which a hollow mandrel is coaxially intermediate the core and the elongate extrusion nozzle, thereby providing a further coaxial annular extrusion passage.

4. An extrusion die as claimed in claim 3, in which the hollow mandrel is releasably attached to the extrusion head by means of threading between a mandrel collar of the extrusion head and an upstream end of the hollow mandrel, whereby the intermediate hollow mandrel is withdrawable from the extrusion head in a downstream direction.

5. An extrusion die as claimed in claim 4, in which a further input port is provided for access of extrudate to the further coaxial annular extrusion passage.

6. An extrusion die as claimed in claim 2, in which the hollow mandrel is carried by a spider on the core and acts to divide the first annular extrusion passage coaxially.

7. An extrusion die as claimed in claim 1, in which the upstream portion of the core is attached to the extrusion head through screw threaded attachment with a core collar bolted to the extrusion head.

8. An extrusion die as claimed in claim 7, in which an axial female socket of the upstream core is releasably attached to an upstream male core extension.

9. An extrusion die as claimed in claim 1, in which the downstream portion of the core carries a forming plug in a mold tunnel.

10. An extrusion die as claimed in claim 1, in which the core carries an inner annular die lip to direct extrudate outwardly towards a molding surface of a mold tunnel nd in which a downstream end of the extrusion nozzle carries a disengageable outer annular die lip to cooperate with the inner die lip to direct extrudate outwardly therebetween, and in which the downstream portion of the core carries a forming plug in a mold tunnel.

11. An extrusion die as claimed in claim 10, in which the upstream end of the forming plug constitutes an inner annular die lip to direct extrudate outwardly towards a molding surface of a mold tunnel and in which a downstream end of the extrusion nozzle carries a disengageable outer annular die lip to cooperate with the inner die lip to direct extrudate outwardly therebetween.

12. An extrusion die as claimed in claim 3 in which the hollow mandrel carries a first inner annular die lip, the first inner die lip being axially adjustable on and disengageable from the hollow mandrel, and in which a downstream end of the extrusion nozzle carries a first disengageable outer annular die lip to cooperate with the first inner die lip to direct extrudate outwardly therebetween as an outer parison.

13. An extrusion die as claimed in claim 12, in which a downstream end of the hollow mandrel carries a second axially adjustable, disengageable outer annular die lip, which cooperates with a second annular inner die lip carried on the core to direct extrudate outwardly between the inner and outer die lips as an inner parison.

14. An extrusion die as claimed in claim 4, in which the extrusion head comprises two axially connected parts, one part including a first inlet for extrudate connected to output through an annular channel between the intermediate hollow mandrel and the extrusion nozzle, and the other part including a second inlet for extrudate connected to output through an annular channel between the core and the intermediate hollow mandrel, said parts being connectable together in at least two configurations in one of which both inlet channels are located to access one extruder and in the other of which the inlet channels are located to access separate extruders.

15. An extrusion die for apparatus for producing seamless thermoplastic tubing, comprising:
   an extrusion head having a bore therethrough and a first input port to the bore for thermoplastic extrudate, the bore having a minimum bore diameter at an upstream end thereof;
   an elongate hollow core extending coaxially through the bore to form a first annular extrusion passage extending coaxially within the extrusion nozzle, and the core having a downstream core portion projecting therefrom and having an upstream end of diameter corresponding to the minimum bore diameter, the upstream core end having a threaded outer surface releasably engaged with the extrusion head and means for engaging an upstream core extension;
   an annular passage for extrudate extending longitudinally in the bore of the extrusion head about the core downstream of the first input port; and
   an elongate extrusion nozzle coaxial about the downstream core portion to extend the annular extrusion passage between said nozzle and said downstream core portion, an upstream end of the elongate extrusion nozzle being rleasably engaged with a downstream portion of the extrusion head.

16. An extrusion die as claimed in claim 15, in which the diameter of the bore increases in a downstream direction.

17. An extrusion die as claimed in claim 16, in which the increase in diameter is stepped.

18. An extrusion die as claimed in claim 17, in which an end of a sleeve coaxial about the extrusion head has a second input port to the bore and a step in the bore is located intermediate the first and second input ports;
   a sleeve about the core and connected thereto is provided within the bore coaxially therewith, one end of the sleeve abutting the step, the sleeve dividing the bore coaxially into an inner annular extrusion passage connected to the first input port and an outer annular extrusion passage connected to the second input port.

19. An extrusion die as claimed in claim 18, in which the sleeve is provided with an elongate sleeve extension coaxial within the extrusion nozzle and about the downstream extension of the core extending the inner annular extrusion passage in a downstream direction.

20. An extrusion die as claimed in claim 19, in which the sleeve extension engages the sleeve by means of screw threading.

21. An extrusion die as claimed in claim 15, in which the means for engaging an upstream core extension comprises screw threading on an inner surface of the core.

* * * * *